(12) United States Patent
Ke et al.

(10) Patent No.: US 11,150,832 B2
(45) Date of Patent: Oct. 19, 2021

(54) METHOD, DEVICE AND COMPUTER PROGRAM PRODUCT FOR BACKUP MANAGEMENT

(71) Applicant: EMC IP Holding Company LLC, Hopkinton, MA (US)

(72) Inventors: Andy Ke, Chengdu (CN); Rita Li, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 81 days.

(21) Appl. No.: 16/586,863

(22) Filed: Sep. 27, 2019

(65) Prior Publication Data

US 2020/0333961 A1    Oct. 22, 2020

(30) Foreign Application Priority Data

Apr. 19, 2019  (CN) .......................... 201910318819.5

(51) Int. Cl.
*G06F 3/06* (2006.01)
*G06F 11/14* (2006.01)

(52) U.S. Cl.
CPC ............ *G06F 3/065* (2013.01); *G06F 3/0608* (2013.01); *G06F 3/0619* (2013.01); *G06F 3/0673* (2013.01); *G06F 11/1461* (2013.01)

(58) Field of Classification Search
None
See application file for complete search history.

(56) References Cited

U.S. PATENT DOCUMENTS

| 9,798,629 | B1* | 10/2017 | Shilane | G06F 11/1464 |
| 10,083,095 | B1* | 9/2018 | Chopra | G06F 11/1464 |
| 2004/0133395 | A1* | 7/2004 | Ding | G06F 11/3452 |
| | | | | 702/182 |
| 2008/0263551 | A1* | 10/2008 | Ali | G06F 11/1461 |
| | | | | 718/102 |
| 2009/0307283 | A1* | 12/2009 | Lehr | G06F 11/1461 |
| 2011/0191777 | A1* | 8/2011 | Bansal | G06F 9/46 |
| | | | | 718/102 |
| 2012/0046804 | A1* | 2/2012 | Bordeleau | H03M 7/3059 |
| | | | | 701/1 |

* cited by examiner

*Primary Examiner* — Kaushikkumar M Patel
(74) *Attorney, Agent, or Firm* — Womble Bond Dickinson (US) LLP (57) ABSTRACT

The present disclosure relates to a method, a device and a computer program product for backup management. An initial set of data items associated with a plurality of historical data backup operations are obtained, a data item in the initial set of data items indicates a data amount and time consumption associated with a corresponding historical data backup operation. A degree of change in time consumption per unit data amount of a candidate data item in the initial set of data items is determined and the candidate data item from the initial set of data items is removed based on the degree of change to generate a reference set of data items, which is stored for predicting time consumption of a future data backup operation.

16 Claims, 5 Drawing Sheets

METHOD, DEVICE AND COMPUTER PROGRAM PRODUCT FOR BACKUP MANAGEMENT

CROSS-REFERENCE TO RELATED APPLICATION

This patent application claims priority, under 35 U.S.C. § 119, of Chinese Patent Application No. 201910318819.5, filed Apr. 19, 2019, entitled "METHOD, DEVICE AND COMPUTER PROGRAM FOR BACKUP MANAGEMENT," which is incorporated by reference herein its entirety.

FIELD

Embodiments of the present disclosure generally relate to the field of computers, and more specifically, to a method, a device and a computer program product for backup management.

BACKGROUND

In recent years, with the development of computer technology, people generate a large amount of digital data every day. The user or service provider usually guarantees data security by means of data backup to prevent some unexpected situations. Typically, there are a large amount of data that need to be backed up, and the people would expect to predict the time it takes to perform a data backup for a better schedule of tasks. Therefore, how to efficiently predict the time required for data backup has become a current focus.

SUMMARY

Embodiments of the present disclosure provide a scheme for backup management.

In accordance with the first aspect of the present application, it provides a method for backup management. The method comprises: obtaining an initial set of data items associated with a plurality of historical data backup operations, a data item in the initial set of data items indicating a data amount and time consumption associated with a corresponding historical data backup operation; determining a degree of change in time consumption per unit data amount of a candidate data item in the initial set of data items; removing the candidate data item from the initial set of data items based on the degree of change to generate a reference set of data items; and storing the reference set of data items for predicting time consumption of a future data backup operation.

In accordance with the second aspect of the present application, it provides a method for backup management. The method comprises: in response to a data backup operation to be performed, determining at least one reference data item corresponding to a target data amount of the data backup operation from the reference set of data items; and determining predicted time consumption to perform the data backup operation based on a data amount and time consumption indicated by the at least one reference data item.

In accordance with the third aspect of the present application, it provides a device for backup management. The device comprises: at least one processing unit; and at least one memory being coupled to the at least one processing unit and storing instructions for execution by the at least one processing unit, the instructions, when executed by the at least one processing unit, causing the device to perform acts comprising: obtaining an initial set of data items associated with a plurality of historical data backup operations, a data item in the initial set of data items indicating a data amount and time consumption associated with a corresponding historical data backup operation; determining a degree of change in time consumption per unit data amount of a candidate data item in the initial set of data items; removing the candidate data item from the initial set of data items based on the degree of change to generate a reference set of data items; and storing the reference set of data items for predicting time consumption of a future data backup operation.

In accordance with the fourth aspect of the present application, it provides a device for backup management. The device comprises: at least one processing unit; and at least one memory being coupled to the at least one processing unit and storing instructions for execution by the at least one processing unit, the instructions, when executed by the at least one processing unit, causing the device to perform acts comprising: in response to a data backup operation to be performed, determining at least one reference data item corresponding to a target data amount of the data backup operation from the reference set of data items; and determining predicted time consumption to perform the data backup operation based on a data amount and time consumption indicated by the at least one reference data item.

In accordance with the fifth aspect of the present application, it provides a computer program product being stored in a non-transitory computer storage medium and comprising machine-executable instructions which, when executed by a device, cause the device to perform the method according to the first aspect of the present application.

In accordance with the sixth aspect of the present application, it provides a computer program product being stored in a non-transitory computer storage medium and comprising machine-executable instructions which, when executed by a device, cause the device to perform the method according to the second aspect of the present application.

The Summary is provided to introduce a selection of concepts in a simplified form, which are further described in the Detailed Description. The Summary is not intended to identify key features or essential features of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

As described above, people would like to predict a time consumption which is required for backup operation. Conventional solutions may predict the time consumption required to perform backup operation based on history-based backup operations. For example, some conventional solutions may determine the predicted time consumption of backup operations by storing historical backup data amount and time consumption, and traversing historical backup data records during the prediction process. Such a solution needs to store a large amount of historical data, and as the data amount increases, the time consumption of the prediction process also increases. Given the timeliness required for backup operations, such a long time for predicting backup operation may be unacceptable.

According to an embodiment of the present disclosure, a solution of backup management is provided. In this solution, initial set of data items associated with a plurality of historical data backup operations can be obtained, wherein a data item in the initial set indicatea a data amount and time consumption associated with a corresponding historical data backup operation. Subsequently, a degree of change in time consumption per unit data amount of a candidate data item in the initial set of data items can be determined, and the candidate data item is then removed from the initial set of data items based on the degree of change to generate a reference set of data items. Further, reference set of data items can be stored for predicting the time consumption of a future data backup operation. By removing one or more data items from the initial plurality of data items to generate a reference set of data items based on the degree of change in degree of change in time consumption per unit data amount, the embodiment of the present disclosure can reduce storage for predicting backup operation consumption. The storage space of the required data items can also reduce the computational complexity and improve the execution efficiency of the prediction of time consumption.

Further, according to an embodiment of the present disclosure, in response to a data backup operation to be performed, at least one reference data item corresponding to a target data amount of the data backup operation can be determined from the reference set of data items, and determining the predicted time consumption to perform a data backup operation based on a data amount and time consumption indicated by at least a reference data item.

Figure 1:
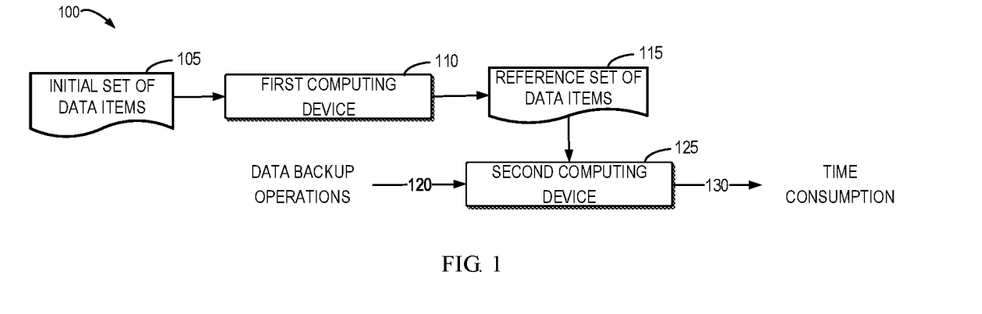
FIG. 1 illustrates diagram of an environment in which embodiment of the present disclosure can be implemented.

FIG. 1 shows a schematic diagram of an environment 100 in which embodiments of the present disclosure may be implemented. As shown in FIG. 1, environment 100 includes a first computing device 110 and a second computing device 125. The first computing device 110 is configured to receive an initial set of data items 105 associated with a plurality of historical data backup operations, wherein each of the initial set of data items 105 indicates a data amount and time consumption associated with a corresponding historical backup operation. The first computing device 110 is further configured to generate a reference set of data items 115 based on the received initial set of data items 105, which will be described in more detail below. The reference set of data items 115 can have a smaller number of data items than the initial set of data items 105, thereby enabling increased storage efficiency and reducing the amount of calculation required to predict time consumption of backups.

As shown in FIG. 1, the second computing device 125 is configured to receive reference set of data items 115 determined by the first computing device 110. For purposes of illustration, the first computing device 110 and the second computing device 125 are shown as different blocks in FIG. 1. It should be understood that the first computing device 110 and the second computing device 125 may be the same or different computing devices. The second computing device 125 is further configured to receive the backup operation 120 to be performed and to predict the time consumption 130 of the data backup operation 120 based on the reference set of data items 115.

Figure 2:
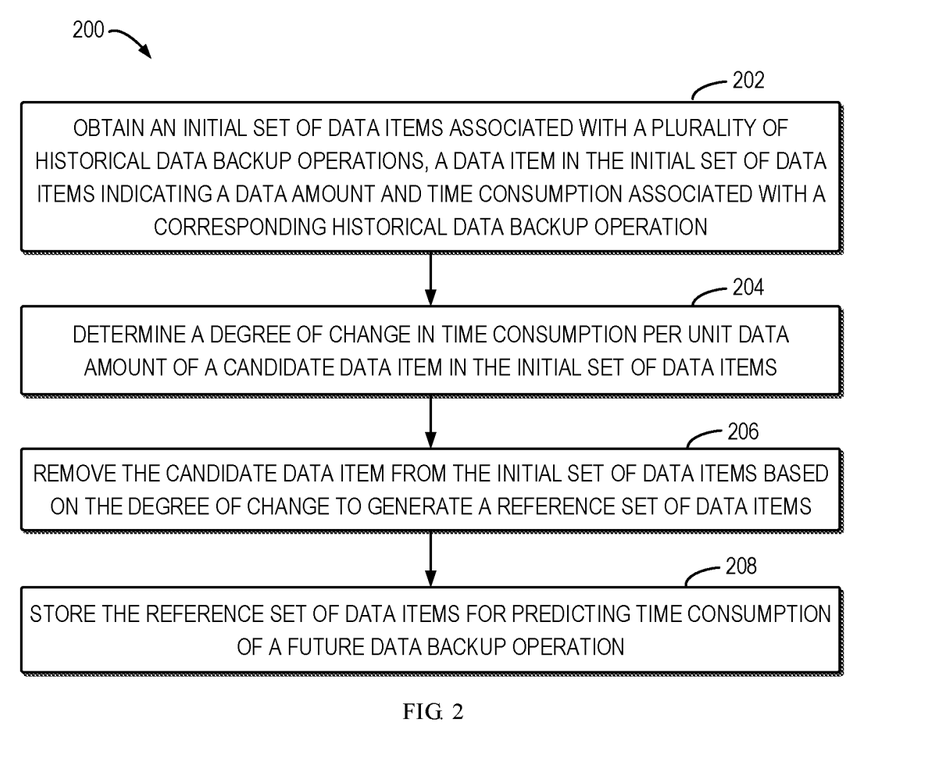
FIG. 2 illustrates a flow chart of a process of backup management in accordance with an embodiment of the present disclosure.
Figure 3:
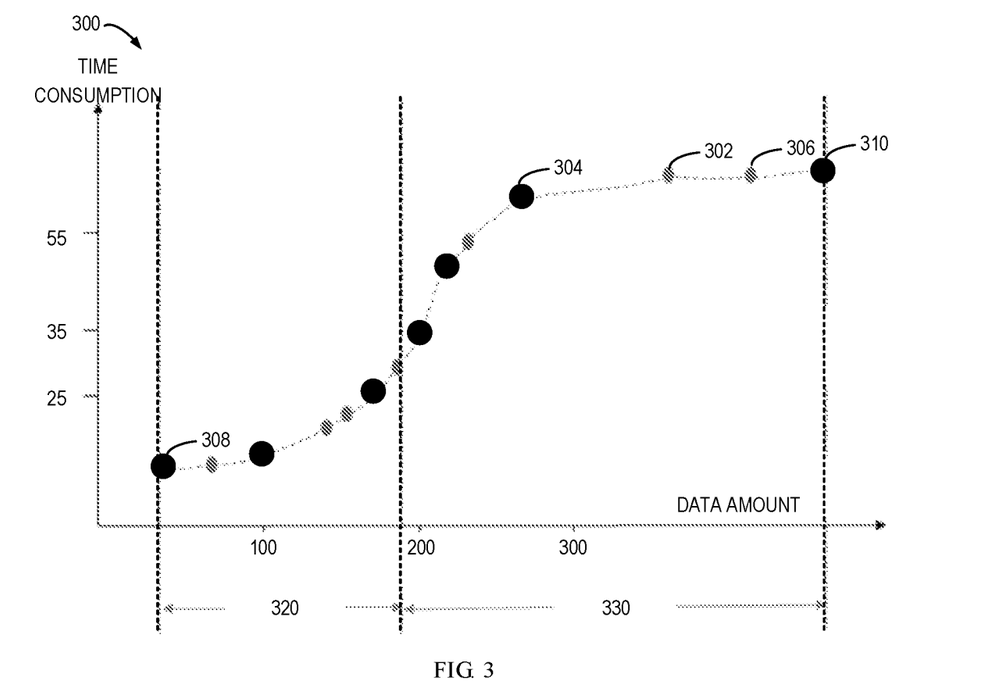
FIG. 3 illustrates a diagram of determining reference set of data items in accordance with an embodiment of the present disclosure.

A process of backup management according to an embodiment of the present disclosure will be described below with reference to FIG. 2 to FIG. 4. FIG. 2 illustrates a flow diagram of a process 200 of backup management in accordance with some embodiments of the present disclosure. Process 200 can be implemented by the first computing device 110 shown in FIG. 1. For ease of discussion, the process 200 of determining a reference set of data items 115 will be described below in conjunction with FIG. 1.

At block 202, the first computing device 110 obtains an initial set of data items 105 associated with a plurality of historical data backup operations and a data item in the initial set of data items 105 indicates a data amount and time consumption associated with a corresponding historical data backup operation. In some embodiments, the data item can be represented in the form of a two-tuple {data amount, time consumption}. In some embodiments, after each data backup operation is finished, the device performing the data backup operations may send the data amount and time consumption information of the current operation to the first computing device 110 to be added to the initial set of data items 104. Alternatively, the device performing the data backup operation may also locally or remotely store the data amount and time consumption information of the performed historical data backup operation, and the first computing device 110 may read the initial set of data items 105 from the storage device storing the initial set of data items 105.

In some embodiments, the initial set of data items 105 may be pre-processed to exclude data items with the same data amount. For example, newer two-tuples can be used to replace existing two-tuples with the same data amount. For example, an average of the time consumption of two-tuples with the same data amount can be set as time consumption in the maintained two-tuple.

At block 204, the first computing device 110 determines a degree of change in time consumption per unit data amount of the candidate data item in the initial set of data items 105. The process of block 204 will be described below in conjunction with FIG. 3 and FIG. 4, wherein FIG. 3 shows a schematic diagram 300 for determining reference set of data items, and FIG. 4 illustrates a flow chart of the process determining the degree of change in accordance with an embodiment of the present disclosure. As shown in FIG. 3, a plurality of data items in the reference set of data items 105 are organized into a plurality of points in a two-dimensional coordinate system according to the data amount and time consumption.

Figure 4:
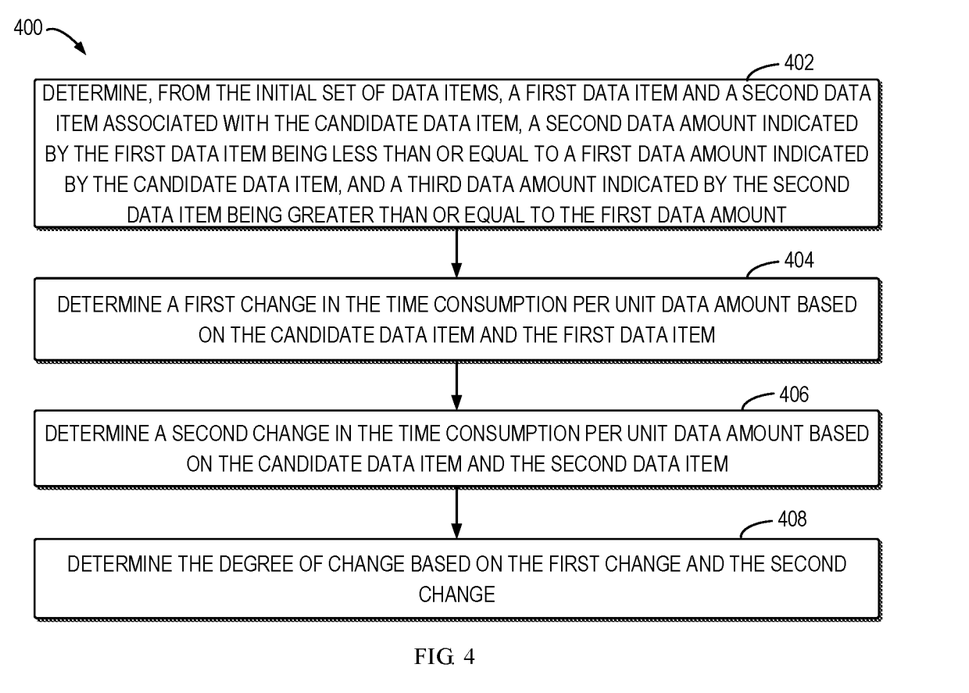
FIG. 4 illustrates a flow chart of a process of determining a degree of change in accordance with an embodiment of the present disclosure.

Specifically, as shown in FIG. 4, at block 402, the first computing device 110 may determine, from the initial set of data items 105, a first data item and a second data item associated with the candidate data item wherein the second data amount indicated by the first data item is less than or equal to the first data amount indicated by the candidate data item, and the third data amount indicated by the second data item is greater than or equal to the first data amount. For example, in the example wherein the data item 302 is a candidate data item in FIG. 3, the first computing device 110 may select two data items 304 and 306 that are respectively left and right adjacent to the candidate data item 302, respectively, as the first data item and second data item. Moreover, for data items located at the edge, such as a data item 308 and a data item 310, since the data item 308 does not have a data item that is smaller than its data amount, the data item 308 itself may be determined as the first data item of candidate data item 308 in this case; similarly, the data item 310 itself may be determined as the second data item of the candidate data item 310.

At block 404, the first computing device 110 may determine a first change in the time consumption per unit data amount based on the candidate data item and the first data item. Specifically, continuing with the example of FIG. 3, considering that the abscissa in the coordinate system in FIG. 3 represents the data amount and the ordinate represents time consumption, the first computing device 110 may calculate the slope (referred to as the first slope for convenience of description) of the line between the candidate data item 302 and the first data item 304 as the first change.

At block 406, the first computing device 110 may determine a second change in the time consumption per unit data amount based on the candidate data item and the second data item. Similar to block 404, the first computing device 110 can calculate a slope (referred to as a second slope for convenience of description) of the line between the candidate data item 302 and the second data item 306 as a second change.

At block 408, the first computing device 110 may determine the degree of change based on the first change and the second change. Continuing with the example of FIG. 3, the first computing device 110 can calculate the absolute value of the difference between the first slope and the second slope as the degree of change.

Referencing back to FIG. 2, at block 206, the first computing device 110 removes candidate data items from the initial set of data items 105 based on the degree of change to generate a reference set of data items 115. In some embodiments, the first computing device 110 can compare the determined degree of change to a predetermined change threshold and, when it is determined that the degree of change is below the change threshold, the first computing device 110 may remove the candidate data item from the initial data items set 105. It should be understood that when the degree of change in time consumption per unit data amount (e.g., the absolute value of the slope difference associated with candidate data item 302 in FIG. 3) is smaller; the candidate data item 302 is closer to the line formed by a data item 304 and the second data item 306 in the coordinate system. That is, the candidate data item 302 can be represented using the first data item 304 and the second data item 306. At this point, the first computing device 110 can remove the candidate data item 302 from the initial set of data items 105, which may not only ensure the expressive ability of the initial set of data items 105, but also reduce the storage space required to store the set of data items. In contrast, when the degree of change in the time consumption per unit data amount (for example, the absolute value of the slope difference value associated with the candidate data item 302 in FIG. 3) is larger, the difference indicated at the candidate data item 302 is larger and such candidate data item 302 should be retained. As shown in FIG. 3, a data item (e.g., data item 304) shown with a larger point is the data item to be retained. In some embodiments, the first computing device 110 may also retain data items (e.g., data items 308 and 310 in FIG. 3) with a maximum data amount and a minimum data amount in the initial set of data items 105.

In another embodiment, the first computing device 110 may retain the data item whose degree of change in the time consumption per unit data amount is above a predetermined change threshold from the initial set of data items 105 as the reference set of data items 115. Alternatively, the first computing device 110 may also retain the data item whose degree of change in the time consumption per unit data amount ranks top N from the initial set of data items 105 as the reference set of data items 115.

In some embodiments, the initial set of data items 105 can be organized into at least one group. For example, as shown in FIG. 3, the initial set of data items 105 can be equally divided into two groups 320 and 330 according to the size of the data amount. At this time, in the process of removing the candidate data item, the first computing device 110 may determine therein a group change threshold corresponding to the group 330 including the candidate data item 302. In some embodiments, different groups may have different group change thresholds. The first computing device 110 can further compare the degree of change to a group change threshold and remove the candidate data item 302 from the initial set of data items 105 when it is determined that the degree of change is below the group change threshold.

In another embodiment, for each of the groups 320 and 330, the first computing device 110 may retain the data item whose degree of change in the time consumption per unit data amount is above a predetermined group change threshold from the groups 320 and 330 as the reference set of data items 115. Alternatively, the first computing device 110 may also retain the data item whose degree of change in the time consumption per unit data amount ranks top N from the initial set of data items 105 as the reference set of data items 115. For example, the first computing device 110 may retain only the data item whose degree of change ranks top 3 in each group.

In some embodiments, the initial set of data items 105 can be organized into multiple groups. For example, it is possible to divide into a plurality of groups equally according to the distribution of the data amount, and each group can be expressed as {minimum data amount, maximum data amount, number of data items}. When a new data item is received, the first computing device 110 can update at least some of the groups such that the difference in the number of data items between any pair of groups of the plurality of groups is less than a predetermined number threshold. In particular, when a new data item is received, the first computing device 110 can update the information for each group by averaging the total data items. In particular, the first computing device 110 can sequentially adjust the data amount boundary of each group according to the number of data items of each new group.

At block 208, the first computing device 110 stores the reference set of data items 115 for predicting the time consumption of a future data backup operations. After obtaining the reference set of data items 115, the first computing device 110 can locally or remotely store the reference set of data items 115 for use in predicting the time consumption of a data backup operation.

Based on the above solution, embodiments of the present disclosure may remove at least one data item from initial data items set to determine a reference set of data items, thereby reducing the space for storing the data item for predicting time consumption of data backup on the basis of ensuring the expressive ability of the initial set of data items. Since a more concise data item set is used, embodiments of the present disclosure also reduce computational complexity for predicting time consumption of data backup, thereby increasing processing efficiency.

Figure 5:
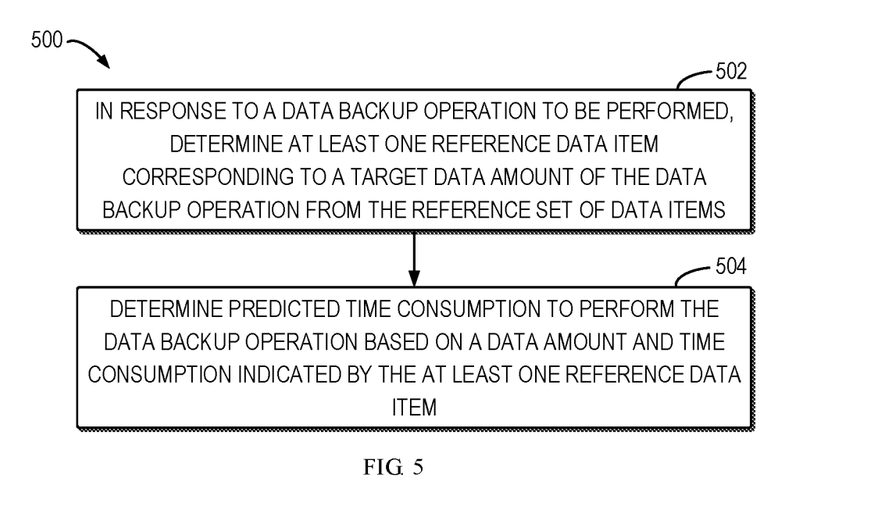
FIG. 5 illustrates a flow chart of a process of backup management according to another embodiment of the present disclosure.

A process of backup management according to an embodiment of the present disclosure will be described below with reference to FIG. 5 to FIG. 7. FIG. 5 illustrates a flow diagram of a process 500 of backup management in accordance with some embodiments of the present disclosure. Process 500 can be implemented by the second computing device 125 in FIG. 1. For ease of discussion, the process 500 of predicting the time consumption 130 of the data backup operation 120 will be described below in conjunction with FIG. 1.

At block 502, in response to the data backup operation 120 to be performed, the second computing device 125 determines at least one reference data item corresponding to the target data amount of the data backup operation from the reference set of data items 115 determined by the first computing device 110. In particular, FIG. 6 illustrates a flow diagram of a process for determining at least one reference data item in accordance with an embodiment of the disclosure.

At block 602, the second computing device 125 may look up the first reference data item in the reference set of data items 115, wherein the first reference data item indicates the same data amount as the target data amount. At block 604, the second computing device 125 determines whether there is a first reference data item, and in response to determining that there is a first reference data item at block 604, the method proceeds to block 606, i.e. the second computing device 125 determines the first reference the data item as a reference data item corresponding to the target data amount. Taking FIG. 7 as an example, FIG. 7 illustrates a diagram 700 of determining a reference data item in accordance with an embodiment of the present disclosure. As shown in FIG. 7, each of the data items in the reference set of data items 115 is indicated by black solid points in FIG. 7. In a case that the target data amount is, for example, equal to the data amount indicated by the data item 704, the data item 704 can be used as a reference data item corresponding to the target data amount.

Figure 6:
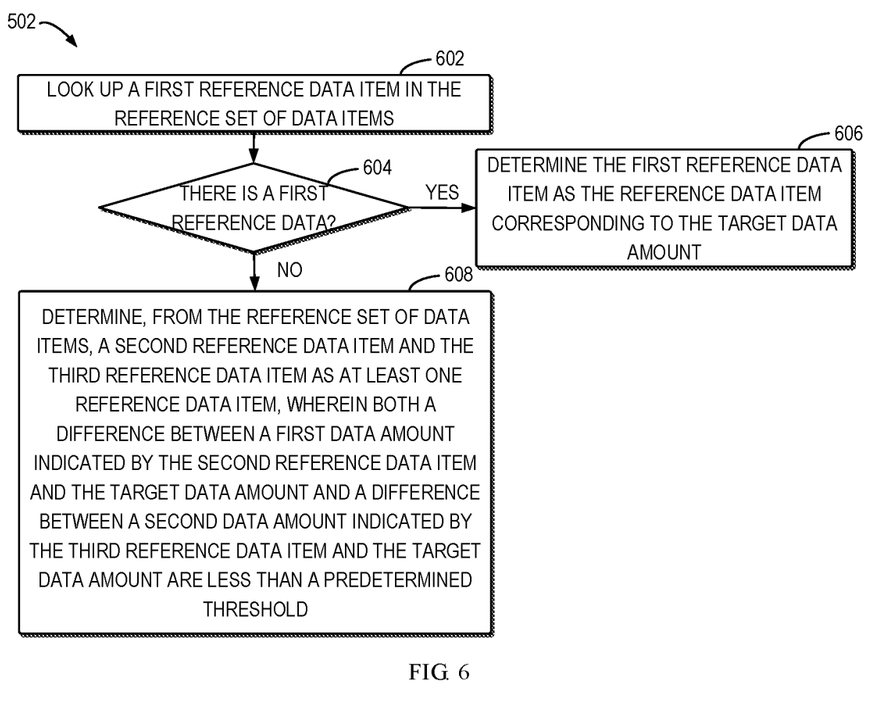
FIG. 6 illustrates a flow chart of a process of determining a reference data item in accordance with an embodiment of the present disclosure.

With continued reference to FIG. 6, in response to determining that there is no first reference data item at block 604, the method proceeds to block 608 where the second computing device 125 determines a second reference data item and the third reference data item as the at least one reference data item from the reference set of data items 115, wherein both a difference between a first data amount indicated by the second reference data item and the target data amount and a difference between a second data amount indicated by the third reference data item and the target data amount are less than a predetermined threshold.

Figure 7:
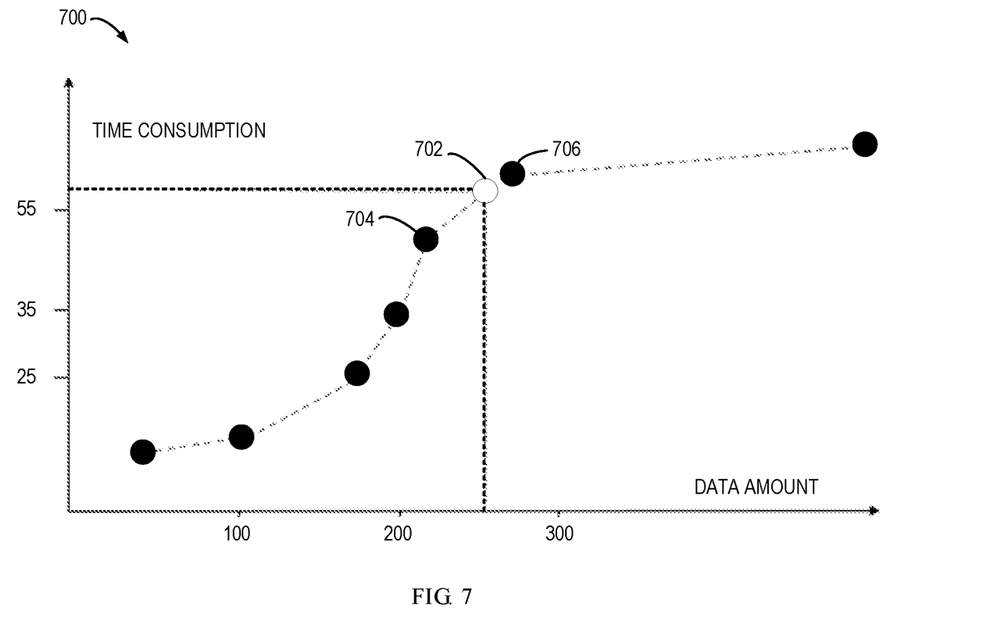
FIG. 7 illustrates a diagram of determining a reference data item in accordance with an embodiment of the present disclosure.

Continuing with the example of FIG. 7, for example, in a case that the target data amount is the data amount indicated by point 702, the second computing device 125 can determine that there is no data item matching with the data amount in the reference set of data items 115. In this case, the second computing device 125 can find the data items corresponding to the data amount left and right adjacent to the target data amount, e.g., the data items 704 and 706 in FIG. 7, and use them as reference data items.

In some embodiments, when the second computing device 125 determines that there is no data item corresponding to a smaller data amount than the target data amount in the reference set of data items 115, the second computing device 125 may select two data items corresponding to two adjacent data amount larger than the target data amount as the reference data items. Similarly, when the second computing device 125 determines that there is no data item corresponding to a larger data amount than the target data amount in the reference set of data items 115, the second computing device 125 may select two data items corresponding to two adjacent data amount smaller than the target data amount as the reference data items.

Referencing back to FIG. 5, at block 504, the second computing device 125 determines the predicted time consumption 130 to perform the data backup operation 120 based on the data amount and time consumption indicated by the at least one reference data item. In some embodiments, when there is a data item corresponding to the target data amount in the reference set of data items 115, the second computing device 125 can determine the time consumption indicated by the data item as the time consumption 130. In another implementation, when there is no corresponding data item, the at least one reference data item may include at least two reference data items, and the second computing device 125 may determine a linear fit of the at least two reference data items, and determine the time consumption based on the target data amount and the linear fit. In particular, in the example of FIG. 7, the second computing device 125 may determine an equation in the coordinate system based on data items 704 and 706: time consumption=f (data amount) and determine predicted time consumption 130 based on the target data item.

Based on the above solution, embodiments of the present disclosure can utilize a small number of reference set of data items than those in the conventional scheme data to predict the time consumption of backup operations, reducing computational complexity for predicting time consumption of data backup, and thus improving processing efficiency.

Figure 8:
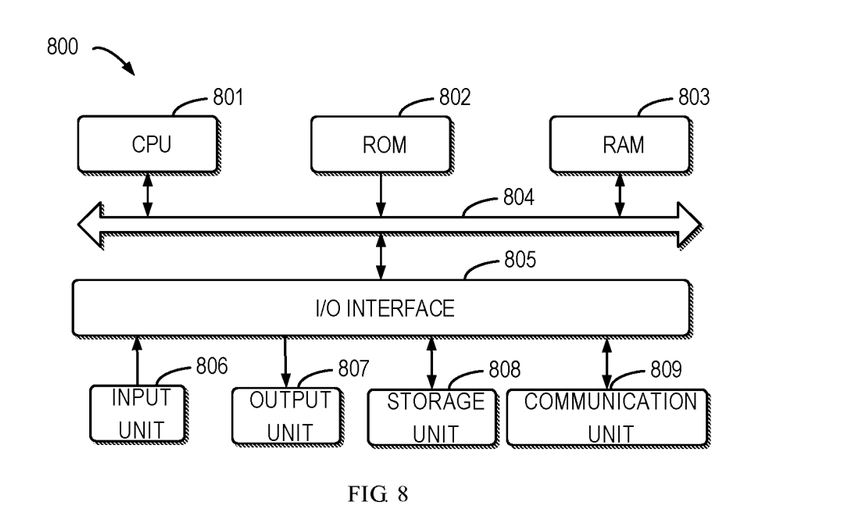
FIG. 8 illustrates a schematic block diagram of an example device used to implement embodiments of the present disclosure.

FIG. 8 shows a schematic block diagram of an example device 800 that can be used to implement embodiments of the present disclosure. For example, the first computing device 110 and/or the second computing device 125 as shown in FIG. 1 can be implemented by device 800. As shown, device 800 includes a central processing unit (CPU) 801 that can perform various appropriate actions according to computer program instructions stored in read only memory (ROM) 802 or loaded from storage unit 808 into a random access memory (RAM) 803. In the RAM 803, various programs and data required for the operation of the device 800 can also be stored. The CPU 801, the ROM 802, and the RAM 803 are connected to each other through a bus 804. An input/output (I/O) interface 805 is also coupled to bus 804.

A plurality of components in device 800 are coupled to I/O interface 805, including: input unit 806, such as a keyboard, mouse, etc.; output unit 807, such as various types of displays, speakers, etc.; storage unit 808, such as a disk and an optical unit, etc.; and a communication unit 809 such as a network card, a modem, a wireless communication transceiver, and the like. Communication unit 809 allows device 800 to exchange information/data with other devices over a computer network such as the Internet and/or various telecommunication networks.

The various processes and processes described above, such as method 200 and/or method 500, may be performed by processing unit 801. For example, in some embodiments, method 200 and/or method 500 can be implemented as a computer software program that is tangibly embodied in a machine readable medium, such as storage unit 808. In some embodiments, some or the entire computer program may be loaded and/or installed onto device 800 via ROM 802 and/or communication unit 809. One or more actions of method 200 and/or method 500 described above may be performed when a computer program is loaded into RAM 803 and executed by CPU 801.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for backup management, comprising:
   receiving at a computing device an initial set of data items associated with a plurality of historical data backup operations, a candidate data item in the initial set of data items indicating a data amount and time consumption associated with a corresponding historical data backup operation;
   determining, by the computing device, from the initial set of data items:
      a first data item and a second data item associated with the candidate data item, a second data amount indicated by the first data item being less than or equal to a first data amount indicated by the candidate data item, and a third data amount indicated by the second data item being greater than or equal to the first data amount;
      a first change in the time consumption per unit data amount based on the candidate data item and the first data item;
      a second change in the time consumption per unit data amount based on the candidate data item and the second data item; and
      a degree of change based on the first change and the second change;
   removing the candidate data item from the initial set of data items based on the degree of change to generate a reference set of data items; and
   storing the reference set of data items for predicting time consumption of a future data backup operation.

2. The method according to claim 1, wherein removing the candidate data item from the initial set of data items comprises:
   comparing, by the computing device, the degree of change with a predetermined change threshold; and
   in response to the degree of change being less than the predetermined change threshold, removing the candidate data item from the initial set of data items.

3. The method according to claim 2, wherein the initial set of data items are organized into at least one group, and wherein removing the candidate data item from the initial set of data items comprises:
   determining, by the computing device, a group change threshold corresponding to a group including the candidate data item;
   comparing the degree of change to the group change threshold; and
   in response to the degree of change being less than the group change threshold, removing the candidate data item from the initial set of data items.

4. The method according to claim 2, wherein the initial set of data items are organized into a plurality of groups, and the method further comprises:
   in response to receiving a new data item, updating, by the computing device, the plurality of groups such that a difference in a number of data items between any pair of groups of the plurality of groups is less than a predetermined number threshold.

5. The method according to claim 1, further comprising:
   in response to a data backup operation performed by the computing device, determining at least one reference data item corresponding to a target data amount of the data backup operation from the reference set of data items; and
   determining predicted time consumption to perform the data backup operation based on a data amount and time consumption indicated by the at least one reference data item.

6. The method according to claim 5, wherein determining the at least one reference data comprises:
   determining whether there is a first reference data item in the reference set of data items, the first reference data item indicating a same data amount as the target data amount; and
   in response to existence of the first reference data item, determining the first reference data item as the reference data item corresponding to the target data amount.

7. The method according to claim 6, wherein determining the at least one reference data comprises:
   in response to absence of the first reference data item, determining, by the computing device, from the reference set of data items, a second reference data item and a third reference data item as at least one reference data item, wherein both a difference between a first data amount indicated by the second reference data item and the target data amount and a difference between a second data amount indicated by the third reference data item and the target data amount are less than a predetermined threshold.

8. The method according to claim 5, wherein the at least one reference data item comprises at least two reference data items, and wherein determining the predicted consumption comprises:

determining, by the computing device, the predicted time consumption based on a linear fit of the at least two reference data items and the target data amount.

9. A device for backup management, comprising:
at least one processing unit; and
at least one memory being coupled to the at least one processing unit and storing instructions for execution by the at least one processing unit, the instructions, when executed by the at least one processing unit, causing the device to perform acts comprising:
obtaining an initial set of data items associated with a plurality of historical data backup operations, a candidate data item in the initial set of data items indicating a data amount and time consumption associated with a corresponding historical data backup operation;
determining from the initial set of data items:
a first data item and a second data item associated with the candidate data item, a second data amount indicated by the first data item being less than or equal to a first data amount indicated by the candidate data item, and a third data amount indicated by the second data item being greater than or equal to the first data amount;
a first change in the time consumption per unit data amount based on the candidate data item and the first data item;
a second change in the time consumption per unit data amount based on the candidate data item and the second data item; and
a degree of change based on the first change and the second change;
removing the candidate data item from the initial set of data items based on the degree of change to generate a reference set of data items; and
storing the reference set of data items for predicting time consumption of a future data backup operation.

10. The device according to claim 9, wherein removing the candidate data item from the initial set of data items comprises:
comparing the degree of change with a predetermined change threshold; and
in response to the degree of change being less than the predetermined change threshold, removing the candidate data item from the initial set of data items.

11. The device according to claim 10, wherein the initial set of data items are organized into at least one group, and wherein removing the candidate data item from the initial set of data items comprises:
determining a group change threshold corresponding to a group including the candidate data item;
comparing the degree of change to the group change threshold; and
in response to the degree of change being less than the group change threshold, removing the candidate data item from the initial set of data items.

12. The device according to claim 10, wherein the initial set of data items are organized into a plurality of groups, and the acts further comprise:
in response to receiving a new data item, updating the plurality of groups such that a difference in a number of data items between any pair of groups of the plurality of groups is less than a predetermined number threshold.

13. The device according to claim 9, the acts further comprise:
in response to a data backup operation to be performed, determining at least one reference data item corresponding to a target data amount of the data backup operation from a reference set of data items; and
determining predicted time consumption to perform the data backup operation based on a data amount and time consumption indicated by the at least one reference data item.

14. The device according to claim 13, wherein determining the at least one reference data comprises:
determining whether there is a first reference data item in the reference set of data items, the first reference data item indicating a same data amount as the target data amount; and
in response to existence of the first reference data item, determining the first reference data item as a reference data item corresponding to the target data amount.

15. The device according to claim 14, wherein determining the at least one reference data comprises:
in response to absence of the first reference data item, determining, from the reference set of data items, a second reference data item and a third reference data item as at least one reference data item, wherein both a difference between a first data amount indicated by the second reference data item and the target data amount and a difference between a second data amount indicated by the third reference data item and the target data amount are less than a predetermined threshold.

16. The device according to claim 13, wherein the at least one reference data item comprises at least two reference data items, and wherein determining the predicted consumption comprises:
determining the predicted time consumption based on a linear fit of the at least two reference data items and the target data amount.

* * * * *